June 2, 1964
M. A. HOLE ETAL
3,135,557
VEHICULAR WHEEL
Filed March 15, 1963
3 Sheets-Sheet 1
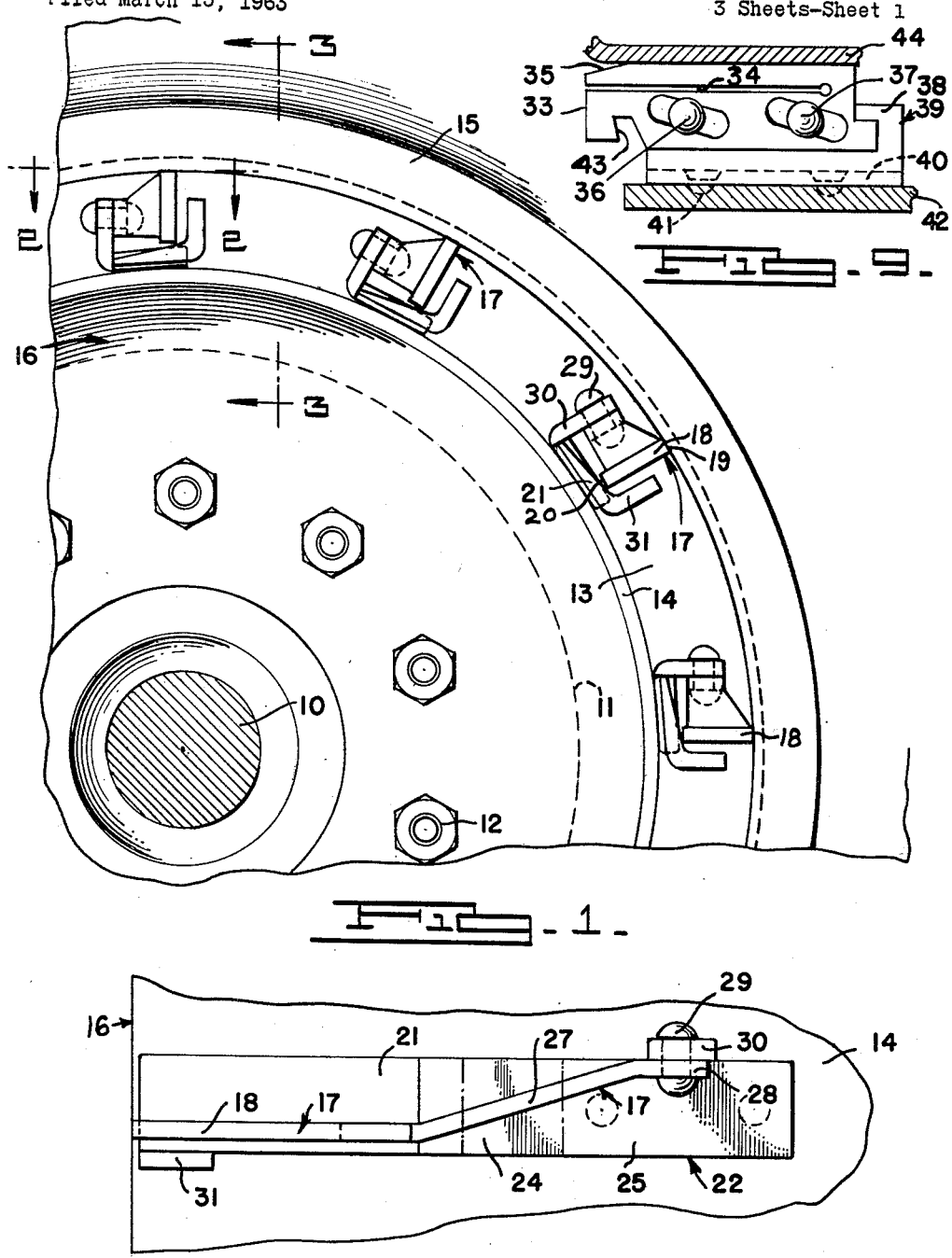
INVENTOR.
MARVIN A. HOLE
BY JOHN H. MURPHY
Donnelly, Mentag & Harrington
ATTORNEYS June 2, 1964  M. A. HOLE ETAL  3,135,557
VEHICULAR WHEEL Filed March 15, 1963  3 Sheets-Sheet 2

INVENTOR.
MARVIN A. HOLE
BY JOHN H. MURPHY

Donnelly, Mentag & Harrington
ATTORNEYS

June 2, 1964  M. A. HOLE ETAL  3,135,557
VEHICULAR WHEEL
Filed March 15, 1963  3 Sheets-Sheet 3
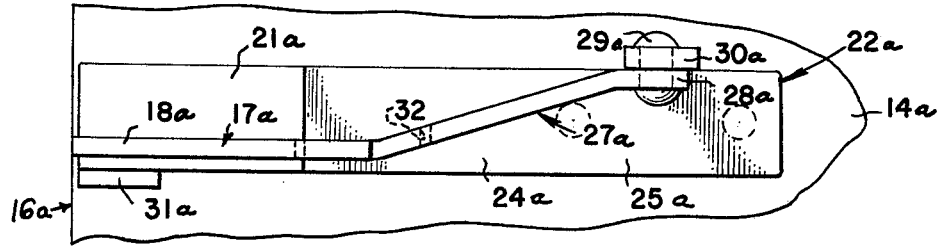
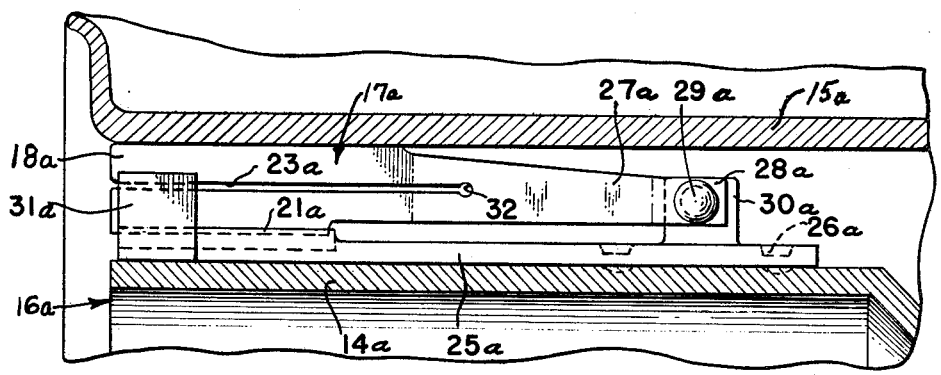
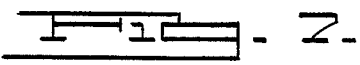
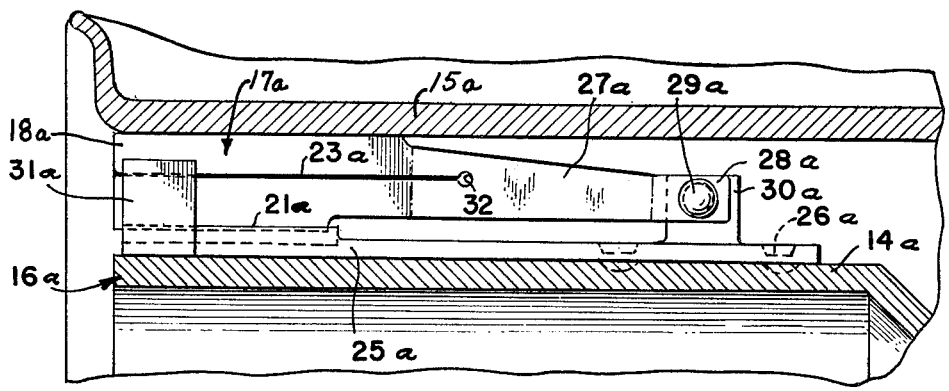
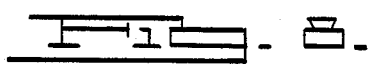
INVENTOR.
MARVIN. A. HOLE
BY JOHN H. MURPHY
ATTORNEYS

United States Patent Office 3,135,557
Patented June 2, 1964

3,135,557
VEHICULAR WHEEL
Marvin A. Hole, Livonia, Pa., and John H. Murphy, Dearborn, Mich., assignors to Multi-Purpose Drum Company, Detroit, Mich., a corporation of Michigan
Filed Mar. 15, 1963, Ser. No. 265,481
4 Claims. (Cl. 301—6)

This invention relates generally to improvements in vehicular wheels which are provided with brake drums that are subjected to high brake pressures and high operating temperatures.

The present invention is an improvement over the structure disclosed in our previous patent, No. 2,940,794, which was issued on June 14, 1960, and more particularly over the structure disclosed in FIGS. 11, 12, 13 and 14 of such patent.

The brake drums of many vehicles such as large trucks and the like are subjected to distortion due to the high brake pressures and the high temperatures to which these brake drums are subjected during operation of the vehicles. Heretofore, many different types of brake drums have been devised in an attempt to overcome such distortion, and improved operating results have been obtained by various brake drum constructions. However, one of the disadvantages of these last mentioned brake drums is that it is difficult to provide for an initial adjustment of the brake drum relative to the vehicle wheel for expansion and contraction of the brake drum without undue effect on the same. Accordingly, it is an important object of the present invention to provide an improved vehicle wheel in which the brake drum includes a plurality of compensators or adjusters which require no adjusting after the brake drum is mounted in place within the tire rim and yet which are constructed to permit normal expansion and contraction of the brake drum due to operating temperature and other conditions.

It is another object of the present invention to provide a novel and improved vehicular wheel with a brake drum provided with a plurality of compensators which are mounted on the brake drum so as to be brought into contact with the tire rim when the brake drum is mounted on the tire rim and which are constructed and arranged to permit expansion of the brake drum without distortion of the same.

It is a further object of the present invention to provide a novel and improved vehicular wheel which is provided with a plurality of compensators on a brake drum to absorb distortion forces caused by brake pressure and high operating temperatures, and which permit the brake drum to expand and contract freely, and which do not require gauges for setting or adjusting the same.

It is still another object of the present invention to provide an improved vehicular wheel having a brake drum on which is mounted a plurality of adjustable compensators for engagement with the tire rim of the wheel to prevent distortion of the brake drum and wherein the compensators are provided with a slit or long narrow opening extending inwardly from the outer end of the compensators, whereby when the brake drum is expanded due to operating pressures and temperatures, the slit will close to provide a solid engagement between the tire rim and the brake drum to prevent objectionable distortion of the brake drum. The slit may be provided either in the compensator itself or in the supporting structure for the same.

It is still a further object of the present invention to provide an improved vehicular wheel having a brake drum provided with a plurality of compensators to permit the brake drum to expand and contract without distortion, and wherein the mounting structure for the compensators may be separately made and attached to the brake drum with the brake drum being made from steel instead of cast iron to provide a lighter and cheaper brake drum than one made from cast iron.

It is still another object of the present invention to provide a novel and improved vehicular wheel having a brake drum constructed to permit expansion and contraction of the same without distortion and which drum is compact and rugged in construction, light in weight, economical of manufacture, possessed of optimum strength and weight characteristics, and walls which are thinner than comparable cast iron brake drum walls.

It is a further object of the present invention to provide an improved vehicular wheel comprising a tire rim and a brake drum concentrically mounted therein, the brake drum having a plurality of circumferentially spaced compensator means mounted on the periphery thereof and extending outwardly toward the tire rim, means for adjusting the compensator means so that their outer surfaces engage the tire rim under all brake pressures and all operating temperatures of the drum, said compensator means having an elongated opening extending longitudinally inwardly from one end thereof under low brake pressures or low operating temperatures of the drum, and said opening being closed under higher brake pressures or higher operating temperatures of the drum.

Other objects, features and advantages of this invention will be apparent from the following detailed description, appended claims, and the accompanying drawings.

In the drawings:

FIG. 1 is a fragmentary, front, elevational view of a wheel having a tire rim thereon and a brake drum made in accordance with the principles of the present invention;

FIG. 2 is a fragmentary, enlarged, horizontal, sectional view of the structure illustrated in FIG. 1, taken along the line 2—2 thereof, and looking in the direction of the arrows;

FIG. 6 is a fragmentary, enlarged, horizontal, sectional view of the structure illustrated in FIG. 5, taken along the line 6—6 thereof, and looking in the direction of the arrows;

FIG. 7 is a fragmentary, enlarged, elevational, sectional view of the structure illustrated in FIG. 5, taken along the line 7—7 thereof, and looking in the direction of the arrows;

FIG. 8 is an elevational, sectional view similar to FIG. 7 and showing the compensator of FIG. 7 in an operative condition with the brake drum expanded; and FIG. 9 is a fragmentary, side, elevational view of a third embodiment of the invention showing a third type of compensator.

Figure 3:
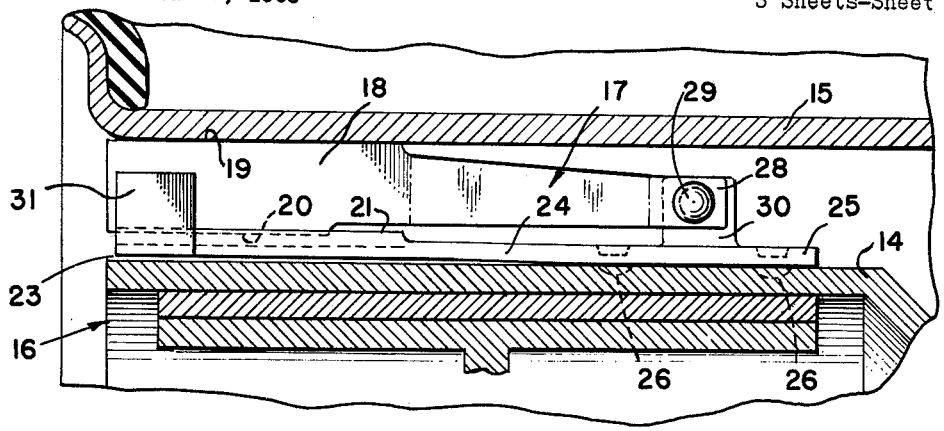
FIG. 3 is a fragmentary, enlarged, elevational sectional view of the structure illustrated in FIG. 1, taken along the line 3—3 thereof, and looking in the direction of the arrows.

Referring now to the drawings, and in particular to FIGS. 1 through 4, the numeral 10 indicates a conventional wheel axle shaft which extends from a drive flange 11. The drive flange 11 is provided with the usual drill holes designated by the numeral 12 through which are mounted suitable bolts for securing the wheel flange 13 in place thereon in the usual manner. The numeral 14 indicates the peripheral flange of the brake drum of the type shown in U.S. Patent No. 2,940,794. The wheel flange 13 is integral with the usual tire rim 15.

As shown in the drawing, the brake drum 16 is made from a suitable steel material which is pressed by any suitable method into the final brake drum form. It is an advantage to make the drums of steel as compared to cast iron as steel is cheaper overall for use in making the drum. The lower cost of making the drum out of steel results from the fact that less labor and time is involved in making the drum from steel. Furthermore, a steel drum requires a lower friction lining for the brakes as compared to the friction lining required for a cast iron drum. A further advantage of the steel type drum is that it will not crack or break as compared to a cast iron drum. A steel drum is also lighter in weight than the comparable cast iron drum and the walls are thinner than a comparable cast iron drum whereby the heat transfer characteristics are more efficient. A steel drum provides lower operating temperatures and more efficient braking because the heat is dissipated faster from the drum due to the smaller wall thickness as compared to a cast iron drum.

The brake drums shown in FIGS. 11 through 14 of the aforementioned patent, show the compensators to be adjustably mounted on a flange which is integral with the brake drum. In the present invention, the compensators are carried on mounting means which are formed separately from the brake drum and which are attached thereto by any suitable means, as by projection welding. As shown in FIG. 1, the brake drum generally indicated by the numeral 16 is provided with a plurality of compensators generally indicated by the numeral 17. Each of the compensators 17 includes the radially disposed rectangularly shaped portion 18 which has parallel upper and lower flat edges 19 and 20, respectively. The upper surface of portion 18 is adapted to be seated against the inner surface of the tire rim flange 15 and the lower surface is adapted to be seated on the inclined surface 21 which is formed on the compensator supporting member generally indicated by the numeral 22. As shown in FIGS. 1 and 3, in the cold or inoperative position, the sloping or cam portion 21 is normally raised or disposed above the brake drum flange 14 by a distance or elongated opening of approximately .015 of an inch, as indicated by the numeral 23. The inner end of the cam portion 21 is integrally connected to the inwardly and downwardly sloping portion 24 which is in turn connected to the flat mounting plate portion 25 of the supporting member 22. The flat mounting plate portion 25 is fixedly connected to the brake drum flange 14 by any suitable means, as by projection welding indicated by the numeral 26.

Figure 4:
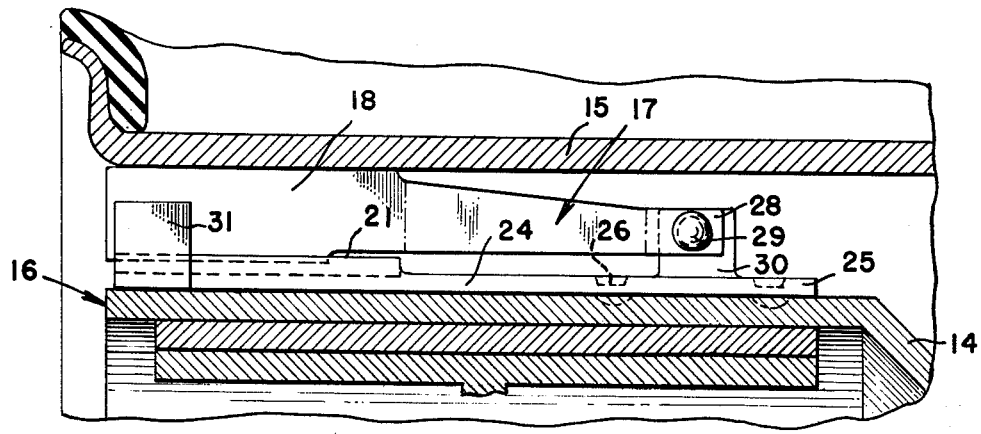
FIG. 4 is an elevational, sectional view similar to FIG. 3 and showing the compensator in an operative position with the brake drum expanded.
Figure 5:
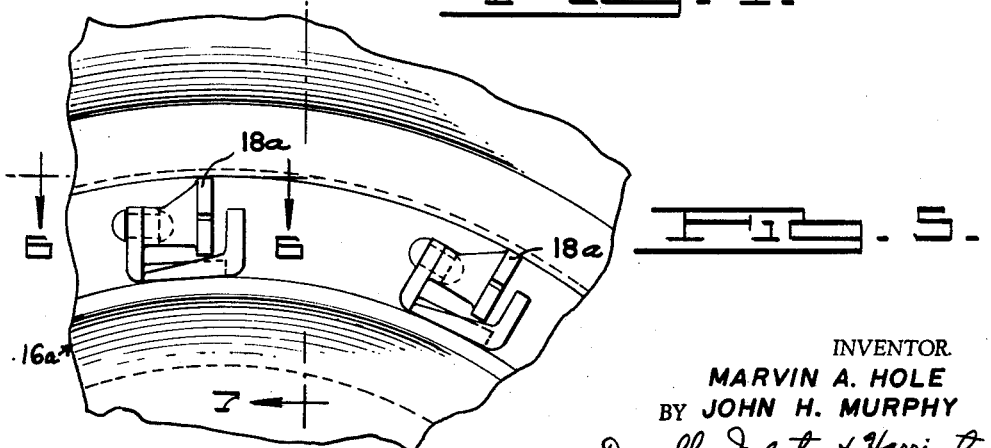
FIG. 5 is a fragmentary, front, elevational view of a portion of a wheel having a tire rim and a brake drum made in accordance with the principles of the present invention and showing a second embodiment of a compensator employed in the invention.

The compensator operating portion 18 is connected by means of the integral portion 27 to the flat mounting plate portion 28 which is disposed parallel with the portion 18 but which is off-set laterally toward the lower end of the cam portion 21. As shown in FIG. 2, the interconnecting portion 27 slopes sidewardly from the inner end of the compensator portion 18 to the outer end of the mounting portion 28. The compensator mounting portion 28 is swingably mounted by means of the rivet 29 to the upwardly extended bracket 30 as shown in FIGS. 2 and 4. The bracket 30 is substantially radially disposed in a plane parallel to the compensator portion 18. As shown in FIGS. 2 and 3, the compensator supporting member 22 is provided at the outer end thereof with the vertical stop bracket 31 for limiting the movement of the compensator portion 18 up the sloping cam portion 21.

In use, the brake drum 16 is mounted within the tire rim 15 with the compensator portion 18 disposed laterally apart from the stop bracket 31 as shown in FIGS. 1 and 2. The brake drum 16 is first turned clockwise as viewed in FIG. 1 to back off the compensator 18 from the cam portion 21 so that the wheel and drum can be assembled. The drum 16 is then turned counter-clockwise until the compensator portion 18 simultaneously engages the inner surface of the tire rim 15 and the sloping face of the cam portion 21. No gauges are required to mount the brake drum in place in the tire rim. The brake drum is thus adapted to be mounted in place in a fast and efficient manner.

When the brake drum expands due to high operating temperatures and pressures, the elongated opening or slit 23 between the lower side of the mounting portion 21 and the brake drum flange 14 will be closed as shown in FIG. 4. The brake drum will thus be supported within the tire rim 15 to permit the brake drum to function without being objectionably distorted. The size of the slit 23 depends on the drum diameter. For example, the slit 23 may be made in a range of .015–.025 when the drum diameter falls within the range of 14½ inches to 16½ inches. The size of the slit 23 would be made on the lower end of the aforecited range when the vehicle is to be used mostly in flat areas or where there are slight hills, whereas the high end of the aforementioned range will be used for making slits for trucks which are driven mostly in hills or mountains. It will be understood that for mountain driving, increased braking is employed with resultant higher temperatures.

FIGS. 5, 6, 7 and 8 illustrate a second embodiment of the invention wherein the slit 23a is provided in the compensator itself instead of under the mounting structure. The similar parts of the embodiment of FIGS. 5 through 8 are marked with the same reference numerals as used for the corresponding structure of FIGS. 1 through 4, followed by the small letter "a." As shown in FIGS. 5 through 8, the only difference between the first and second embodiments is that the slit 23a is formed within the compensator portion 18a and this slit extends rearwardly into the laterally sloping portion 27a. The slit 23a terminates at the point indicated by the numeral 32. The embodiment of FIGS. 5 through 8 functions in the same manner as the embodiment of FIGS. 1 through 4 and when the brake drum 16a is heated due to high operating pressures and temperatures, the slit 23a will be closed as shown in FIG. 8 to provide a solid backing connection between the tire rim 15a and the brake drum flange 14a and permit the brake drum to operate without distortion after use thereof.

FIG. 9 is a third embodiment of the invention in which the compensator is indicated by the numeral 33. The compensator 33 is provided with a slit 34 which extends into the compensator from the outer end thereof. The slit 34 is made within the same requirements and range as mentioned hereinbefore for the other embodiments, that is, in the range of .015–.025 of an inch. The outer upper end of the compensator is relieved or chamfered as indicated by the numeral 35. The compensator 33 is secured by means of the rivets 36 and 37 on the vertical leg 38 of the single mounting bracket generally indicated by the numeral 39. The horizontal leg 40 of the bracket 39 is secured as by means of projection welding 41 to the brake drum flange 42. The embodiment of FIG. 9 functions in the same manner as the first two described embodiments. That is, the brake drum carrying a plurality of compensators 33 is mounted within the tire rim 44 and is moved into engagement with the tire rim by means of a screw driver engaged with the slot 43 and pivoting the same to move the compensator 33 to the left as shown in FIG. 9 into engagement with the tire rim 44. The rivets 36 and 37 hold the compensator 33 on the bracket 38 by means of a pinch force which is sufficient to hold the compensator in place, yet permit it to be adjusted. Suitable bolts and spring washers could be used to hold the compensator 33 in place, if desired.

While it will be apparent that the preferred embodiments of the invention herein disclosed are well calculated to fulfill the objects above stated, it will be appreciated that the invention is susceptible to modification, variation and change without departing from the proper scope of fair meaning of the subjoined claims.

What we claim is:

1. A vehicular wheel comprising: a tire rim and a brake drum concentrically mounted therein, the brake drum having a plurality of circumferentially spaced compensator means mounted on the periphery thereof and extending outwardly toward the tire rim, means for adjusting the compensator means so that their outer surfaces engage the tire rim under all brake pressures and all operating temperatures of the drum, said compensator means having any elongated opening extending longitudinally inwardly from one end thereof under low brake pressures or low operating temperatures of the drum, and said opening being closed under higher brake pressures or higher operating temperatures of the drum.

2. The combination of elements as defined in claim 1 in which said compensator means comprises a compensator mounted on a supporting means which is attached to the brake drum, and said elongated opening is formed in the compensator.

3. The combination of elements as defined in claim 1 in which said compensator means comprises a compensator mounted on a supporting means which has one end thereof attached to the brake drum, and said elongated opening is formed beneath the other end of said supporting means and the brake drum.

4. The combination of elements as defined in claim 1 in which said compensator means comprises a compensator mounted on a supporting means which is attached to the brake drum, said opening being formed in said compensator, and means for attaching the compensator to the supporting means comprising at least one outwardly and upwardly sloping elongated hole formed through the compensator and a holding means extended through said hole and attached to the supporting means for holding the compensator on the supporting means.

References Cited in the file of this patent
UNITED STATES PATENTS
2,940,794    Murphy et al. _____ June 14, 1960